US008849489B2

(12) United States Patent
Patel et al.

(10) Patent No.: US 8,849,489 B2
(45) Date of Patent: Sep. 30, 2014

(54) SHIFT EXECUTION CONTROL SYSTEM FOR AN ELECTRICALLY VARIABLE TRANSMISSION

(75) Inventors: Nadirsh Patel, Farmington Hills, MI (US); Ashish Krupadanam, Cupertino, CA (US); Goro Tamai, West Bloomfield, MI (US); Mengyang Zhang, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 156 days.

(21) Appl. No.: 13/531,907

(22) Filed: Jun. 25, 2012

(65) Prior Publication Data

US 2013/0030626 A1 Jan. 31, 2013

Related U.S. Application Data

(60) Provisional application No. 61/513,150, filed on Jul. 29, 2011.

(51) Int. Cl.
| | |
|---|---|
| *B60W 10/02* | (2006.01) |
| *B60W 10/10* | (2012.01) |
| *B60W 10/06* | (2006.01) |
| *B60W 10/08* | (2006.01) |
| *B60W 20/00* | (2006.01) |
| *B60W 30/192* | (2012.01) |
| *B60W 30/00* | (2006.01) |
| *B60W 10/105* | (2012.01) |
| *B60K 6/445* | (2007.10) |
| *F16H 61/66* | (2006.01) |
| *F16H 37/08* | (2006.01) |
| *F16H 61/04* | (2006.01) |

(52) U.S. Cl.
CPC ....... *B60W 30/00* (2013.01); *B60W 2510/1045* (2013.01); *B60W 10/08* (2013.01); *F16H 2061/6603* (2013.01); *B60W 30/192* (2013.01); *Y02T 10/6239* (2013.01); *F16H 2037/0873* (2013.01); *B60W 2720/106* (2013.01); *F16H 2061/6609* (2013.01); *F16H 61/0437* (2013.01); *B60W 10/105* (2013.01); *B60W 2510/102* (2013.01); *F16H 61/66* (2013.01); *Y02T 10/76* (2013.01); *B60W 2710/083* (2013.01); *B60K 6/445* (2013.01); *Y10S 903/93* (2013.01); *Y10S 903/945* (2013.01); *Y10S 903/946* (2013.01)
USPC ............... 701/22; 701/55; 701/67; 701/95; 477/70; 477/166; 903/930; 903/945; 903/946

(58) Field of Classification Search
USPC ........ 701/22, 55, 67, 95, 51, 64, 87; 903/945, 903/930, 946; 475/31; 477/70, 79, 166
See application file for complete search history.

(56) References Cited

U.S. PATENT DOCUMENTS 8,066,615 B2 * 11/2011 Martini et al. ................... 477/3
8,116,961 B2 * 2/2012 Bogema et al. .............. 701/103

(Continued)

FOREIGN PATENT DOCUMENTS

FR 2 929 574 A1 10/2009

*Primary Examiner* — Tuan C. To
(74) *Attorney, Agent, or Firm* — Ralph E. Smith (57) ABSTRACT

A system and method of controlling first and second electric motors of a vehicle having an electrically variable transmission during an engine start/stop operation. The system and method determine a type of shift being performed, determine if a first clutch is being applied or released during the shift, determine if a second clutch is being applied or released during the shift, determine an acceleration limit based on the shift being performed and which clutch is being applied and/or released, determine acceleration and speed profiles based on the shift being performed, which clutch is being applied and/or released and the acceleration limit, determine a first electric motor torque and a second electric motor torque based on the acceleration and speed profiles, and set the torques of the first and second electric motors to the determined first and second electric motor torques.

14 Claims, 6 Drawing Sheets

(56) References Cited

U.S. PATENT DOCUMENTS

| | | | |
|---|---|---|---|
| 8,192,327 B2* | 6/2012 | Gibson et al. | 477/77 |
| 8,290,681 B2* | 10/2012 | Kaminsky et al. | 701/99 |
| 8,401,768 B2* | 3/2013 | Lewis et al. | 701/112 |
| 8,406,971 B2* | 3/2013 | Balton et al. | 701/54 |
| 2008/0275625 A1* | 11/2008 | Snyder | 701/104 |
| 2009/0118880 A1 | 5/2009 | Heap et al. | |
| 2009/0118931 A1 | 5/2009 | Kaminsky et al. | |
| 2009/0118949 A1* | 5/2009 | Heap et al. | 701/55 |
| 2009/0118951 A1* | 5/2009 | Heap et al. | 701/56 |
| 2009/0118963 A1* | 5/2009 | Heap | 701/99 |
| 2009/0215586 A1* | 8/2009 | Kresse | 477/110 |
| 2010/0228412 A1 | 9/2010 | Sah | |
| 2011/0009236 A1 | 1/2011 | Yang et al. | |
| 2011/0118915 A1* | 5/2011 | Ortmann et al. | 701/22 |
| 2012/0283922 A1* | 11/2012 | Phillips et al. | 701/66 |
| 2012/0323416 A1* | 12/2012 | McGrogan et al. | 701/22 |
| 2012/0323418 A1* | 12/2012 | Sah et al. | 701/22 |

\* cited by examiner

| POINT(S) | DESCRIPTION |
|---|---|
| A | VEHICLE STARTS IN IB-EV MODE. MOTORS A AND B PROPEL THE VEHICLE |
| A TO B | VEHICLE OPERATES IN IB-EV MODE. MOTORS A AND B PROPEL THE VEHICLE |
| B | IB-EV TO OD-EV SHIFT. MOTOR B PROPELS THE VEHICLE |
| B TO C | OD-EV MODE. MOTOR B PROPELS THE VEHICLE. MOTOR A ACCELERATES THE ENGINE |
| C | ENGINE STARTS. OD-EV TO OD-EO TRANSITION |
| C TO D | OD-EO MODE. ENGINE AND MOTORS PROPEL THE VEHICLE |
| D | OD-EO TO UD-EO SHIFT |
| D TO E | UD-EO MODE. ENGINE AND MOTORS PROPEL THE VEHICLE. HIGHER RATIO FROM ENGINE TO OUTPUT |
| E | UD-EO TO OD-EO SHIFT |
| E TO F | OD-EO MODE. ENGINE AND MOTORS PROPEL THE VEHICLE. LOWER RATIO FROM ENGINE TO OUTPUT |
| F | ENGINE SHUT-OFF. OD-EO TO OD-EV TRANSITION. MOTOR B PROPELS THE VEHICLE OR PROVIDES REGENERATIVE BRAKING AS NEEDED |
| F TO G | OD-EV MODE. MOTOR B PROPELS THE VEHICLE OR PROVIDES REGENERATIVE BRAKING AS NEEDED. MOTOR A SPINS ENGINE DOWN TO ZERO SPEED |
| G | OD-EV TO IB-EV SHIFT. BOTH MOTORS A AND B PROVIDE REGENERATIVE BRAKING (OR PROPULSION) AS NEEDED |
| G TO H | IB-EV MODE. BOTH MOTORS A AND B PROVIDE REGENERATIVE BRAKING (OR PROPULSION) AS NEEDED |
| H | VEHICLE STOPS IN IB-EV MODE |

SHIFT EXECUTION CONTROL SYSTEM FOR AN ELECTRICALLY VARIABLE TRANSMISSION

CROSS-REFERENCE TO RELATED APPLICATION

This application claims the benefit of U.S. Provisional Application No. 61/513,150, filed Jul. 29, 2011.

FIELD

The present disclosure relates to the control of an automotive transmission, specifically to a shift execution control system and method for controlling an electrically variable transmission.

BACKGROUND

Some current hybrid electrically variable transmissions feature two electric motors coupled to an internal combustion engine utilizing a plurality of clutches and gear sets. At certain times it is desirable to operate the transmissions in strictly an electric mode or in a hybrid mode where the internal combustion engine and one or both motors operate simultaneously. Managing the many parameters such as clutch, engine and motor torques, battery power levels and usage, efficiency and smooth shifting between the various gears and drive modes, fuel economy, operational-cost efficiency, etc. pose many operational control challenges.

Thus, there remains a need for continuous improvement in the operational control of hybrid electrically variable transmissions.

SUMMARY

In one form, the present disclosure provides a method of controlling first and second electric motors of a vehicle having an electrically variable transmission during a transmission shift operation. The method comprises: using a processor to perform the steps of determining a type of shift being performed; determining if a first clutch is being applied or released during the shift; determining if a second clutch is being applied or released during the shift; determining an acceleration limit based on the shift being performed and which clutch is being applied and/or released; determining acceleration and speed profiles based on the shift being performed, which clutch is being applied and/or released and the acceleration limit; determining a first electric motor torque and a second electric motor torque based on the acceleration and speed profiles; setting a torque of the first electric motor to the determined first electric motor torque; and setting a torque of the second electric motor to the determined second electric motor torque.

The present disclosure also provides a controller for controlling first and second electric motors of a vehicle having an electrically variable transmission during a transmission shift operation. The controller comprises a processor that is programmed to: determine a type of shift being performed; determine if a first clutch is being applied or released during the shift; determine if a second clutch is being applied or released during the shift; determine an acceleration limit based on the shift being performed and which clutch is being applied and/or released; determine acceleration and speed profiles based on the shift being performed, which clutch is being applied and/or released and the acceleration limit; determine a first electric motor torque and a second electric motor torque based on the acceleration and speed profiles; set a torque of the first electric motor to the determined first electric motor torque; and set a torque of the second electric motor to the determined second electric motor torque.

Further areas of applicability of the present disclosure will become apparent from the detailed description, drawings and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
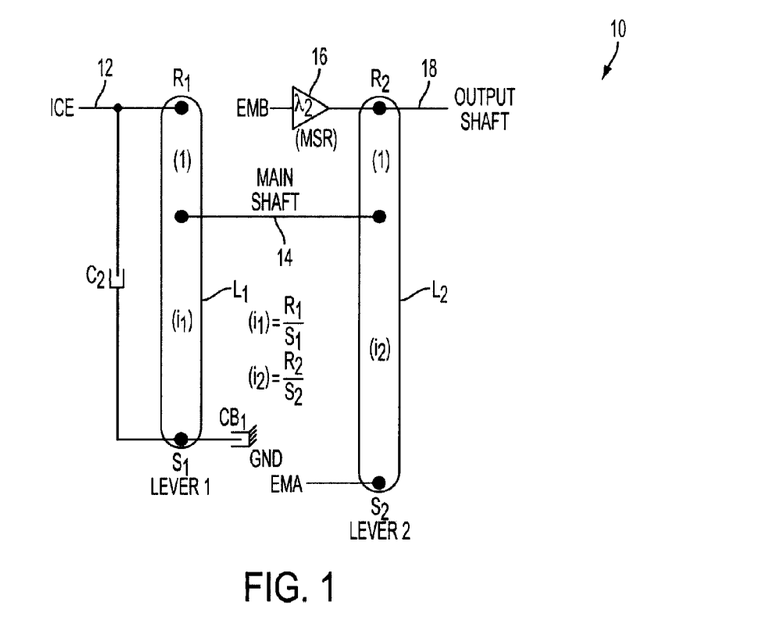
FIG. 1 is an illustration of a lever diagram of a drive system for a vehicle with an electrically variable transmission.

U.S. patent application Ser. No. 12/882,936, (the "'936 Application") filed Sep. 15, 2010 and titled "Multi-Speed Drive Unit," discloses various compound-input electrically variable transmissions ("EVT"), the disclosure incorporated herein by reference. U.S. patent application Ser. No. 13/188, 799; filed Jul. 22, 2011 and titled "Clutch System for a Transmission", the disclosure incorporated herein by reference, discloses a clutch system that can be used e.g., in the '936 Application's multi-speed drive unit to create a two dry "clutch" drive system, similar to a DDCT (dual dry clutch transmission), for the drive unit. FIG. 1 is an example lever diagram of such a drive system 10.

A seen in FIG. 1, the drive system 10 includes a first planetary gear set represented by a first lever $L_1$ and a second planetary gear set represented by a second lever $L_2$. A ring gear $R_1$ of the first planetary gear set is connected to an internal combustion engine ICE via an input shaft 12. A sun gear $S_1$ of the first planetary gear set is connected to two clutches $CB_1$, $C_2$. In the illustrated example, the first clutch $CB_1$ is a braking mechanism that, when activated, grounds the sun gear $S_1$ to the drive unit's transaxle case. When activated, the second clutch $C_2$ connects the sun gear $S_1$ to the engine. An input brake is created when both clutches $CB_1$, $C_2$ are activated at the same time.

The carriers of the planetary gear sets are connected via a main shaft 14. A sun gear $S_2$ of the second planetary gear set is connected to a first electric motor EMA. A ring gear $R_2$ of the second planetary gear set is connected to a second electric motor EMB via a motor speed reducer ("MSR") 16. The ring gear $R_2$ of the second planetary gear set is also connected to an output shaft 18. The motor speed reducer 16 controls the speed ratio between the second electric motor EMB and the output shaft 18.

The '936 Application discloses three input ratios. A first ratio is created by activating the first clutch $CB_1$ while deactivating the second clutch $C_2$. A second ratio is created by deactivating the first clutch $CB_1$ while activating the second clutch $C_2$. The third ratio is the input brake created by activating the first and second clutches $CB_1$, $C_2$.

Figure 2:
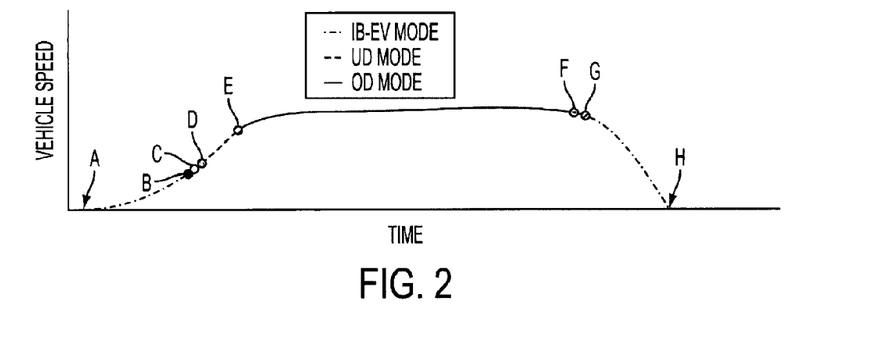
FIG. 2 is an illustration of an example drive cycle for a vehicle in accordance with the present disclosure.

FIG. 2 is an illustration of an example drive cycle for a vehicle containing a FIG. 1 drive system 10 and being controlled in accordance with the present disclosure. In the example, the vehicle accelerates from a stop, cruises at high speed and brakes to a stop. The various points and switching points of the drive cycle are listed in the table shown in FIG. 3.

Figure 3:
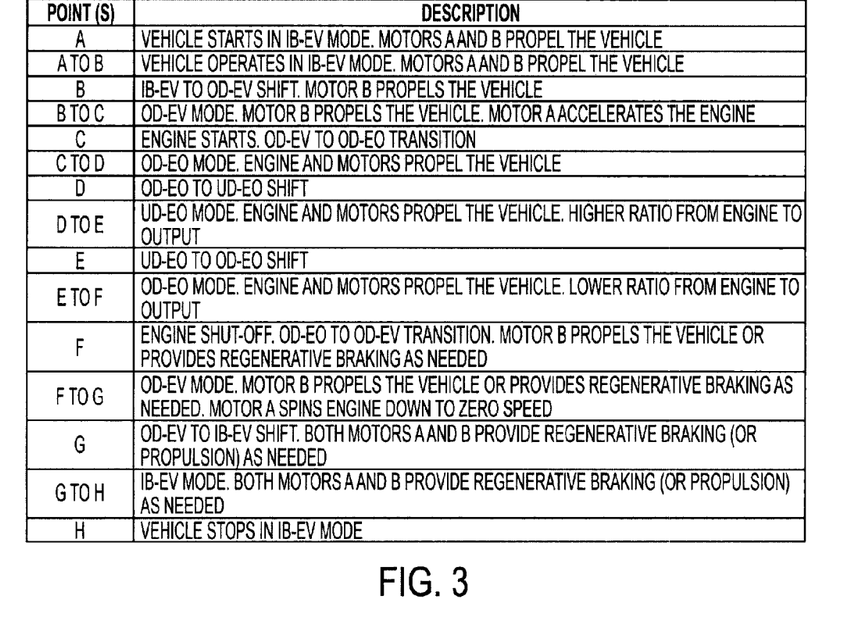
FIG. 3 is a table describing the various drive cycle points illustrated in FIG. 2.

During the cycle, the system 10 enters different modes to deliver the required output power from the electric motors and/or engine to the output shaft. The modes are chosen for best fuel economy and drive quality. The system 10 will operate in the following modes: input brake electric vehicle ("IB-EV"), under drive electric vehicle ("UD-EV"), over drive electric vehicle ("OD-EV"), under drive engine on ("UD-EO"), over drive engine on ("OD-EO"), and neutral (N). As shown in the table of FIG. 3, there are points and modes when the electric motors are propelling the vehicle without assistance from the engine (e.g., point A), propelling the vehicle with the assistance from the engine (e.g., points D to E) or providing regenerative braking (e.g., point G).

Both clutches $CB_1$ and $C_2$ will be applied (i.e., engaged or activated) to implement the IB-EV mode. The first clutch $CB_1$ will be applied while the second clutch $C_2$ is not applied (i.e., disengaged or deactivated) to implement the UD-EV and UD-EO modes. The first clutch $CB_1$ will not be applied while the second clutch $C_2$ is applied to implement the OD-EV and OD-EO modes. Both clutches $CB_1$ and $C_2$ will be disengaged in the neutral mode. It should be appreciated that this disclosure refers to the first clutch $CB_1$ as a braking clutch, but the disclosure is not limited to a braking clutch; as shown in the '936 application, many clutches or synchronizers could be used in the system 10.

The aspects of the present disclosure are designed to control the drive system during the execution of shifts (i.e., IB-EV to OD-EV, IB-EV to UD-EV, UD-EO to OD-EO, OD-EO to UD-EO, OD-EV to IB-EV, UD-EV to IB-EV, etc.) such as the ones that occur at points B, D, E and G in FIG. 2. Aspects disclosed herein will calculate component limits, and come up with motor and clutch torque commands needed for a smooth shift that is imperceptible to the driver. The shift execution control methods described herein is implemented on a controller or programmed processor in the drive system. In one preferred implementation, the aspects described herein will be implemented as part of a supervisory hybrid electric vehicle controller 902 (FIG. 9) such as the one described in U.S. application No. 61/513,061; filed Jul. 29, 2011 and titled "Engine Start Control System for an Electrically Variable Transmission", the disclosure incorporated herein by reference.

In general, a transmission shift mainly involves changing the gear ratio between the engine (input shaft 12, input speed $N_i$) and the main planetary carrier (planetary carrier speed $N_{pc}$). To do so, the main planetary carrier and the first electric motor EMA must move up or down in speed. The acceleration of the carrier shaft $\dot{N}_{pc}$, however, must be within various hybrid systems constraints (e.g., motor torque limits, clutch torque limits and battery power limits) while maintaining certain key drive quality parameters (e.g., output shaft acceleration/jerk) within reasonable limits.

The type of shift to be executed may change depending on the shift type and various event-based triggers (e.g., ambient temperatures, battery temperatures, motor temperatures, etc.). As will be discussed in more detail below, the three major distinct shift types, according to the present disclosure, include (1) a clutch-to-clutch shift with input torque $T_i$ control, (2) a clutch-to-clutch shift with first motor torque $T_a$, second motor torque $T_b$ and battery power $P_{batt}$ control, and (3) a synchronous shift with first motor torque $T_a$, second motor torque $T_b$ and battery power $P_{batt}$ control.

Generally, the clutch-to-clutch shift with input torque $T_i$ control is achieved with changing input speed $N_i$. The main controlled parameters will be the input torque $T_i$, first clutch torque $T_{CB1}$, second clutch torque $T_{C2}$ and battery power $P_{batt}$. The shift will occur during battery/motor constrained operations and has the benefit of minimum changes in the first motor torque $T_a$, second motor torque $T_b$, and battery power $P_{batt}$.

The clutch-to-clutch shift with input torque $T_i$ control shift event is performed based on certain known event triggers that would normally lead to a bad shift if it were performed based on the first motor torque $T_a$, second motor torque $T_b$, and battery power $P_{batt}$. One example situation would involve really cold ambient and battery temperatures, which would lead to severely constrained battery power limits. The constrained battery power limits would result in a shift having too long of a duration, which could affect clutch life and shift quality. Thus, the important controlled parameter in the clutch-to-clutch shift with input torque $T_i$ control is battery power $P_{batt}$ and the allowable output torque operating envelope, which would dictate what the controlled torques (i.e., input torque $T_i$, first clutch torque $T_{CB1}$, second clutch torque $T_{C2}$) would look like.

The control strategy for the clutch-to-clutch shift with input torque $T_i$ control shift event can be broken up into 3 key states: (1) the calculation of input acceleration $\dot{N}_i$ limits; (2) the generation of profiles for the desired planetary carrier speed $N_{pc\_des}$ and acceleration $\dot{N}_{pc\_des}$ and the desired input $N_i$ speed and acceleration $\dot{N}_i$; and (3) the generation of clutch torque $T_{c1}$, $T_{c2}$, engine torque $T_o$ and motor torque $T_a$, $T_b$ commands.

The calculation of the input acceleration $\dot{N}_i$ limits is performed based on the hybrid system's component constraints. Current motor speeds are used to determine the first and second motor torque $T_a$, $T_b$ limits. Maximum and minimum engine torque limits are also accounted for. Battery power $P_{batt}$ limits are determined based on certain shift calibrations, which could lead to having the first and second motor torques $T_a$, $T_b$ commanded to severely maintain the battery power $P_{batt}$, or to allow for a certain amount of $P_{batt}$ deviation, centered on certain event-based triggers.

Figure 4:
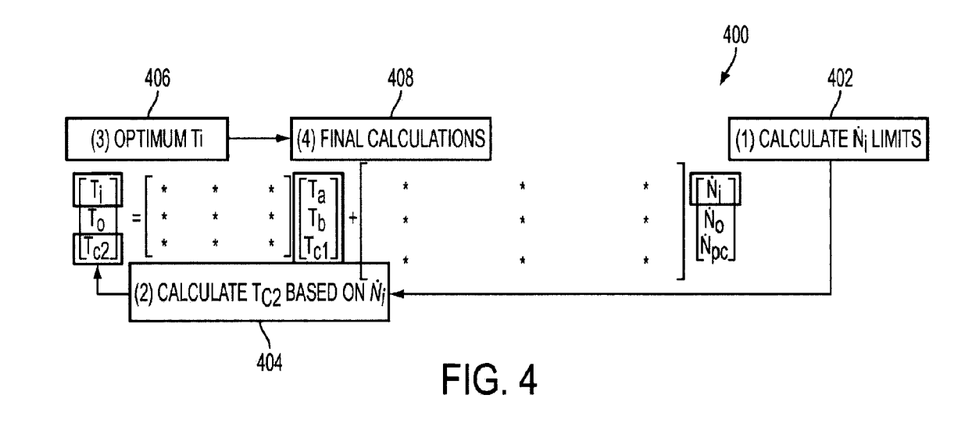
FIG. 4 is a flowchart of a shift execution control process for a first shift in accordance with the present disclosure.
Figure 5:
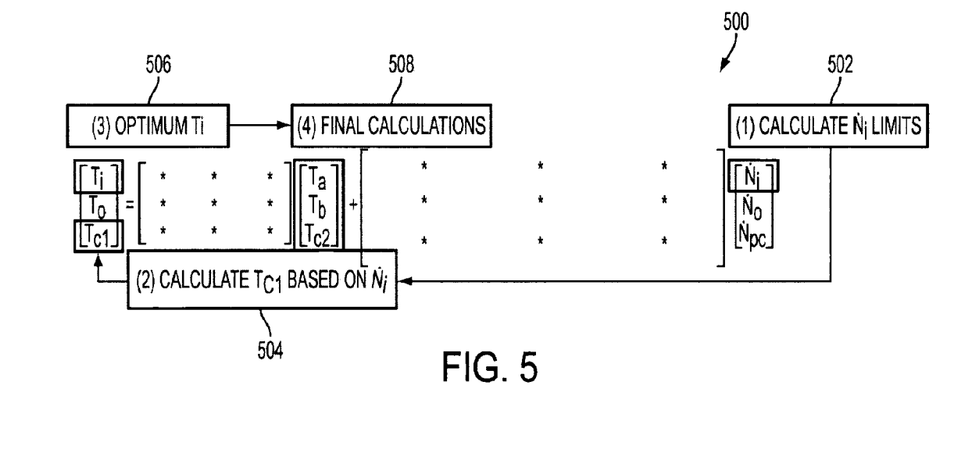
FIG. 5 is a flowchart of a shift execution control process for a second shift in accordance with the present disclosure.

Based on estimated clutch torques, clutch limits are evaluated for both the applying and releasing clutches. Clutch torque limits, however, depend on whether the clutch in question is currently being applied or released. FIG. 4 illustrates a process 400 for an under drive-to-over drive shift in which the first clutch $CB_1$ is the releasing clutch while the second clutch $C_2$ is the applying clutch. FIG. 5 illustrates a process 500 for an over drive-to-under drive shift in which the first clutch $CB_1$ is the applying clutch while the second clutch $C_2$ is the releasing clutch. For a clutch being applied, a torque rising-rate limit is calculated based on certain shift calibrations such as the time for a particular state of the shift. The applying clutch torque limits are evaluated based on the loop rate of the controller and the torque rate limit specified. A similar process is carried out to determine the clutch torque limits for the releasing clutch. Taking into account the above specified component torque limits and battery power limits, acceleration limits for the input shaft $N_1$ are determined at steps 402 and 502.

The generation of the profiles for the desired planetary carrier speed $N_{pc\_des}$ and acceleration $\dot{N}_{pc\_des}$ and the desired input $N_i$ speed and acceleration $\dot{N}_i$ are based on the calculated final carrier speed $N_{pc}$, the input shaft speed $N_i$ at the end of the shift, the path of minimum clutch energy loss and certain shift calibrations depending on the type of shift. The desired speed and acceleration profiles are generated such that they lie within the acceleration limits calculated in the previous step. The generated speed and acceleration profiles $N_{pc\_des}$, $N_i$, $\dot{N}_{pc\_des}$, $\dot{N}_i$ are sent to the engine and motor controllers to calculate the required input torque $T_i$, first motor torque $T_a$ and second motor torque $T_b$ to maintain and follow the desired shift profile (discussed below in more detail).

The generation of clutch $T_{c1}$, $T_{c2}$, engine $T_o$ and motor torque $T_a$, $T_b$ commands can now occur. Based on the desired carrier acceleration profile $\dot{N}_{pc\_des}$ calculated in the previous step, the applying clutch torque command is given within the rate-limits explained above. Based on the torque carried by the applying clutch during the shift and the type of shift being performed, the final torques for the engine, first and second electric motors EMA, EMB and the releasing clutch are calculated based on the corresponding shift equations illustrated in FIGS. 4 and 5.

Referring to FIG. 4, for the under drive-to-over drive shift, the first clutch $CB_1$ is the releasing clutch and the second clutch $C_2$ is the applying clutch. Thus, clutch $C_2$ will be the driving member of this shift and at step 404 the torque for the second clutch $T_{C2}$ is calculated based on the input acceleration $\dot{N}_i$ limits calculated at step 402. At step 406, the optimum input torque $T_1$ is determined by the input torque controller. At step 408, the first motor torque $T_a$, second motor torque $T_b$ and the first clutch torque $T_{C1}$ are determined and commanded to the appropriate controllers (illustrated in FIG. 9) to maintain the desired output torque $T_o$.

Referring to FIG. 5, for the over drive-to-under drive shift, the first clutch $CB_1$ is the applying clutch and the second clutch $C_2$ is the releasing clutch. As such, the first clutch $CB_1$ will be the driving member of this shift and at step 504 the torque for the first clutch $T_{C1}$ is calculated based on the input acceleration $\dot{N}_i$ limits calculated at step 502. At step 506, the optimum input torque $T_i$ is determined by the input torque controller. At step 508, the first motor torque $T_a$, second motor torque $T_b$ and the second clutch $T_{C2}$ are determined and commanded to the appropriate controllers to maintain the desired output torque $T_o$.

Turning now to the second major shift type, the clutch-to-clutch shift with first motor torque $T_a$, second motor torque $T_b$ and batter power $P_{batt}$ control is achieved with swinging main planetary carrier speed $N_{pc}$. The main controlling parameters will be first clutch torque $T_{CB1}$, second clutch torque $T_{C2}$, first motor torque $T_a$, and second motor torque $T_b$. The shift occurs during normal operation to ensure shift quality while maintaining optimum engine operation.

This particular type of shift is performed within certain known ambient conditions to help maintain shift quality. A major advantage of this type of shift is that it is done based on maintaining torque at the input shaft. This allows for a shift to take place without going through the inefficiency of spark retard to reduce input torque quickly during the shift. This shift from a system stand-point is one of the most efficient shift types available. This shift ensures accuracy of driver requested output torque $T_o$ by using the first motor torque $T_a$, second motor torque $T_b$ and battery power $P_{batt}$ to help maintain the output torque $T_o$ at the desired level (or with an allowable minimum controlled deviation in torque). This is the quickest type of shift available and also has the least amount of impact on drivability. This shift is executed based on certain event triggers such as e.g., available battery power limits, battery voltage, ambient and component temperatures, etc.

The control strategy for the clutch-to-clutch shift with first motor torque $T_a$, second motor torque $T_b$ and batter power $P_{batt}$ control shift event can be broken up into 3 key states: (1) the calculation of planetary carrier acceleration $\dot{N}_{pc}$ limits; (2) the generation of desired planetary carrier speed $N_{pc\_des}$ and acceleration $\dot{N}_{pc\_des}$ profiles; and (3) the generation of clutch torque $T_{c1}$, $T_{c2}$, and motor torque $T_a$, $T_b$ commands.

Figure 6:
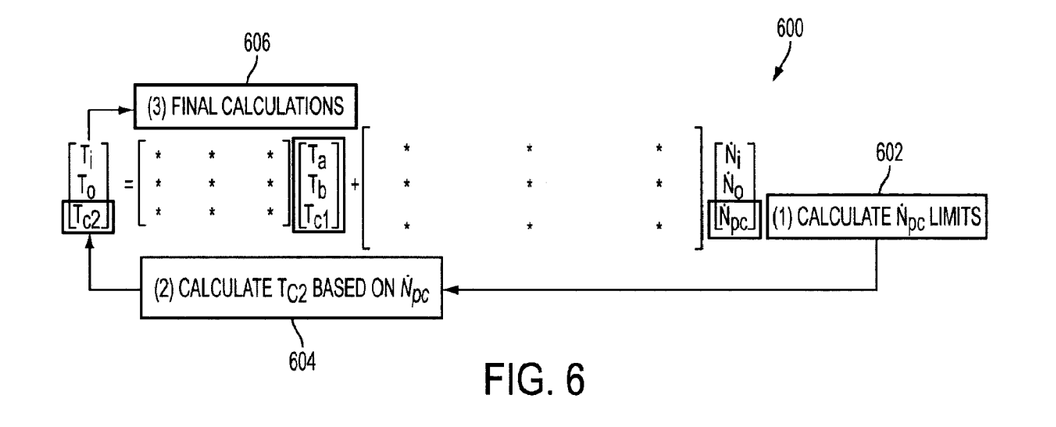
FIG. 6 is a flowchart of a shift execution control process for a third shift in accordance with the present disclosure.
Figure 7:
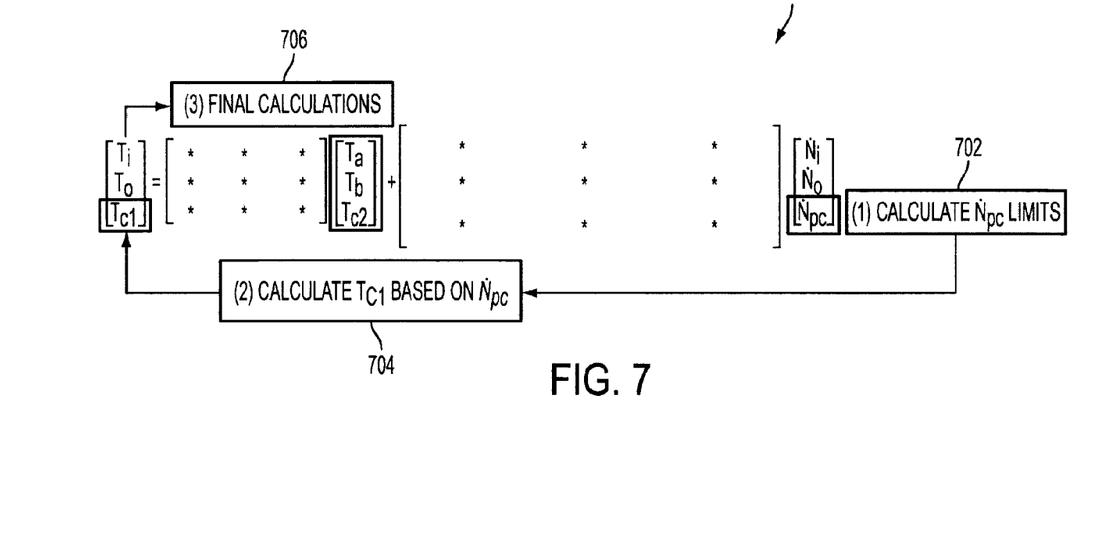
FIG. 7 is a flowchart of a shift execution control process for a fourth shift in accordance with the present disclosure.

The calculation of the planetary carrier acceleration $\dot{N}_{pc}$ limits is performed based on the hybrid system's component constraints. Current motor speeds are used to determine the first and second motor torque $T_a$, $T_b$ limits. Based on estimated clutch torques, clutch limits are evaluated for both the applying and releasing clutches. Clutch torque limits depend on whether the clutch in question is currently being applied or released. FIG. 6 illustrates a process 600 for an under drive-to-over drive shift in which the first clutch $CB_1$ is the releasing clutch while the second clutch $C_2$ is the applying clutch. FIG. 7 illustrates a process 700 for an over drive-to-under drive shift in which the first clutch $CB_1$ is the applying clutch while the second clutch $C_2$ is the releasing clutch.

For a clutch being applied, a torque rising-rate limit is calculated based on certain shift calibrations such as the time for a particular state of the shift. The applying clutch torque limits are evaluated based on the loop rate of the controller and the torque rate limit specified. A similar process is carried out to determine the clutch torque limits for the releasing clutch. Taking into account the above specified component torque limits and battery power limits, acceleration limits for the main carrier shaft $\dot{N}_{pc}$ are determined at steps 602 and 702.

The generation of the profiles for the desired planetary carrier speed $N_{pc\_des}$ and acceleration $\dot{N}_{pc\_des}$ are based on the calculated final carrier speed $N_{pc}$ at the end of the shift, the path of minimum clutch energy loss and certain shift calibrations depending on the type of shift. The desired speed and acceleration profiles are generated such that they lie within the acceleration limits calculated in the previous step. The generated speed and acceleration profiles $N_{pc\_des}$, $\dot{N}_{pc\_des}$ are used to generate the respective open/closed loop motor torque response needed to follow the required shift profile (discussed below in more detail).

The generation of clutch torques $T_{c1}$, $T_{c2}$ and motor torque $T_a$, $T_b$ commands can now occur. Based on the desired carrier acceleration profile $\dot{N}_{pc\_des}$ the applying clutch torque command is given within the rate-limits explained above. Based on the torque carried by the applying clutch during the shift and the type of shift being performed, the final torques for the first and second electric motors EMA, EMB and the releasing clutch are calculated based on the corresponding shift equations illustrated in FIGS. 6 and 7.

Referring to FIG. 6, for the under drive-to-over drive shift, the first clutch $CB_1$ is the releasing clutch and the second clutch $C_2$ is the applying clutch. Thus, clutch $C_2$ will be the driving member of this shift and at step 604 the torque for the second clutch $T_{C2}$ is calculated based on the planetary carrier acceleration $\dot{N}_{pc}$ limits calculated at step 602. At step 606, the first motor torque $T_a$, second motor torque $T_b$ and the first clutch torque $T_{C1}$ are determined and commanded to the appropriate controllers to maintain the desired output torque $T_o$.

Referring to FIG. 7, for the over drive-to-under drive shift, the first clutch $CB_1$ is the applying clutch and the second clutch $C_2$ is the releasing clutch. As such, the first clutch $CB_1$ will be the driving member of this shift and at step 704 the torque for the first clutch $T_{C1}$ is calculated based on the planetary carrier acceleration $\dot{N}_{pc}$ limits calculated at step 702. At step 706, the first motor torque $T_a$, second motor torque $T_b$ and the second clutch $T_{C2}$ are determined and commanded to the appropriate controllers to maintain the desired output torque $T_o$.

Turning now to the third major shift type, the synchronous shift with first motor torque $T_a$, second motor torque $T_b$ and batter power $P_{batt}$ control is achieved by disconnecting the releasing clutch, using the first motor torque $T_a$ or second motor torque $T_b$ to change the carrier input speed, and connecting the applied clutch. The shift is performed to maintain shift quality when the hybrid system is far from various torque and power constraints. The shift is easily controllable, does not require high fidelity clutch observer models and provides good shift quality.

This particular shift maintains the accuracy of the output torque $T_o$, by disconnecting the first and second clutches $CB_1$, $C_2$ and using the first electric motor EMA to swing the main powersplit carrier shaft to the desired carrier speed $N_{pc}$ while the second electric motor EMB reacts and maintains the output torque $T_o$. This shift is used generally at lower vehicle speeds when the hybrid system is not power or torque limited.

The control strategy for the synchronous shift with first motor torque $T_a$, second motor torque $T_b$ and batter power $P_{batt}$ control shift event can be broken up into 3 key states: (1) the calculation of planetary carrier acceleration $\dot{N}_{pc}$ limits; (2) the generation of desired planetary carrier speed $N_{pc\_des}$ and acceleration $\dot{N}_{pc\_des}$ profiles; and (3) the generation of first and second motor torque $T_a$, $T_b$ commands.

The calculation of the planetary carrier acceleration $\dot{N}_{pc}$ limits is performed based on the hybrid system's component constraints. Current motor speeds are used to determine the first and second motor torque $T_a$, $T_b$ limits. Clutch torque limits are now taken to zero to ensure calculation of the acceleration limits with the first and second clutches $CB_1$, $C_2$ clutches disconnected.

The generation of the profiles for the desired planetary carrier speed $N_{pc\_des}$ and acceleration $\dot{N}_{pc\_des}$ are based on the calculated final carrier speed $N_{pc}$ at the end of the shift, the path of minimum clutch energy loss and certain shift calibrations depending on the type of shift. The desired speed and acceleration profiles are generated such that they lie within the acceleration limits calculated in the previous step. The generated speed and acceleration profiles $N_{pc\_des}$, $\dot{N}_{pc\_des}$ are used to generate the respective open/closed loop motor torque response needed to follow the required shift profile (discussed below in more detail).

The generation of the motor torque $T_a$, $T_b$ commands can now occur. Based on the desired carrier acceleration profile $\dot{N}_{pc\_des}$ calculated in the previous step, the final torques for the first and second electric motors EMA, EMB are calculated based on the corresponding shift equations as discussed below. For the IB-EV mode, both the first and second clutches $CB_1$, $C_2$ are completely engaged. This allows the main carrier of the powersplit device to be held stationary so that both motors EMA, EMB can contribute to driving the vehicle in the electric vehicle operating state. During the electric vehicle operating state, clutch torque estimates and slip speeds are closely monitored to ensure that neither clutch will slip and to prevent the engine from spinning. If a certain amount of slip is detected, both clutches $CB_1$, $C_2$ will be released and the first electric motor torque $T_a$ will immediately be set to zero as a fail-safe. Transitions in and out of this transmission state would mostly be synchronous, with the main carrier shaft speed $N_{pc}$ being bought to zero in the Under-drive (UD) or Over-drive (OD) transmission state.

Figure 8:
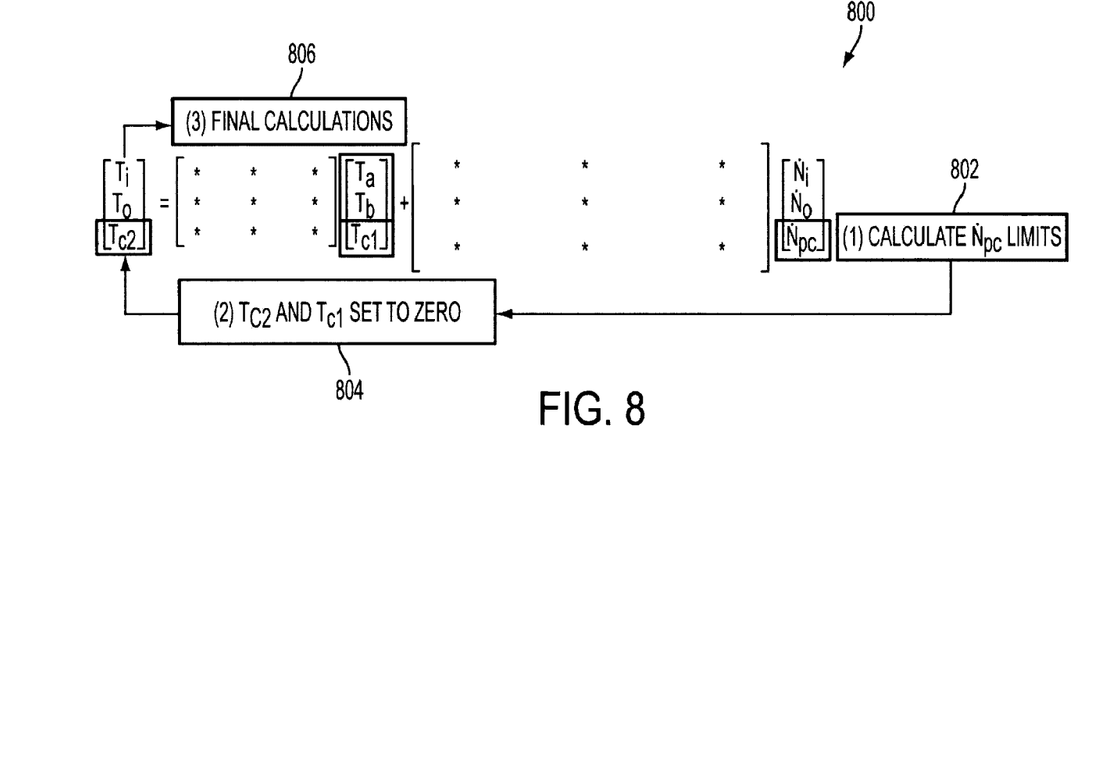
FIG. 8 is a flowchart of a shift execution control process for a fifth shift in accordance with the present disclosure.

FIG. 8 illustrates a process 800 for an under drive-to-over drive shift or an over drive-to-under drive shift for the synchronous shift with first motor torque $T_a$, second motor torque $T_b$ and batter power $P_{batt}$ control shift event. In these shifts, both clutches $CB_1$, $C_2$ will be released and the motor torque $T_a$, $T_b$ will be determine and commanded as shown in FIG. 8.

Acceleration limits for the main carrier shaft $\dot{N}_{pc}$ are determined at step 802. At step 804, the first and second clutch torques $T_{c1}$, $T_{c2}$ are set zero. At step 806, the first motor torque $T_a$ and the second motor torque $T_b$ are determined and commanded to the appropriate controllers to maintain the desired output torque $T_o$.

Figure 9:
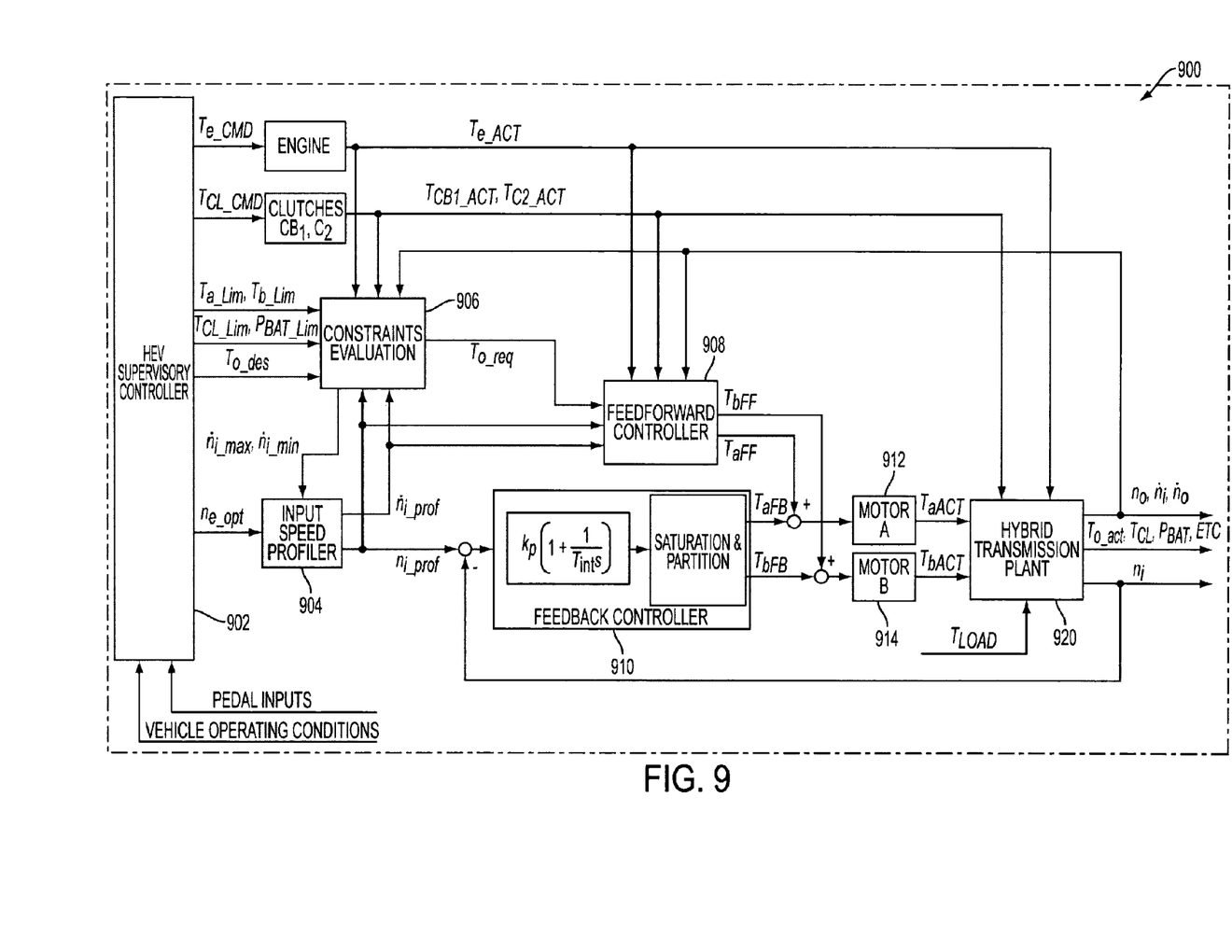
FIG. 9 is a block diagram of a portion of a vehicle's powertrain incorporating a controller for executing the methodology disclosed herein.

FIG. 9 is a block diagram of a portion of a vehicle's powertrain 900 incorporating a supervisory hybrid electric vehicle controller 902 for executing the processes 400, 500, 600, 700, and 800 disclosed herein. The powertrain 900 also includes an input speed profiler 904, a constraints evaluator 906, a feedforward controller 908, feedback controller 910, the engine, first and second clutches $CB_1$, $C_2$, first and second electric controllers 912, 914 for controlling the first and second motors EMA, EMB, and a hybrid transmission plant 920. The supervisory hybrid electric vehicle controller 902 executes the processes 400, 500, 600, 700, and 800 and inputs pedal position and the various other vehicle operating conditions and parameters discussed above. Outputs from the supervisory hybrid electric vehicle controller 902 are used to control the engine, clutches $CB_1$, $C_2$ and the motors EMA, EMB (via the input speed profiler 904, constraints evaluator 906, feedforward controller 908, motor controllers 912, 914 and the feedback controller 910) in accordance with the processed described herein. The other operations of the powertrain 900, including the input speed profiler 904, constraints evaluator 906, feedforward controller 908, the feedback controller 910, as well as the various parameters used by these components, are discussed in more detail in the U.S. Application No. 61/513,061, titled Engine Start Control System for an Electrically Variable Transmission".

What is claimed is:
1. A method of controlling first and second electric motors of a vehicle having an electrically variable transmission during a transmission shift operation, said method comprising using a processor to perform the steps of:
  determining whether a type of shift being performed is (1) a clutch-to-clutch shift with input torque control, (2) a clutch-to-clutch shift with first and second motor torque and battery power control or (3) a synchronous shift with first and second motor torque and battery power control;
  determining if a first clutch is being applied or released during the transmission shift operation;
  determining if a second clutch is being applied or released during the transmission shift operation;
  determining an acceleration limit based on the type of shift being performed and which of the first and the second clutch is being applied and/or released;
  determining acceleration and speed profiles based on the type of shift being performed, which of the first and the second clutch is being applied and/or released and the acceleration limit;
  determining a first electric motor torque and a second electric motor torque based on the acceleration and speed profiles;

setting a torque of the first electric motor to the determined first electric motor torque;
setting a torque of the second electric motor to the determined second electric motor torque;
determining a first clutch torque and a second clutch torque based on the acceleration and speed profiles;
setting a torque of the first clutch to the determined first clutch torque; and
setting a torque of the second clutch to the determined second clutch torque.

2. The method of claim 1, further comprising:
determining an engine torque based on the acceleration and speed profiles; and
setting a torque of the engine to the determined engine torque.

3. The method of claim 1, wherein the determined acceleration limit is an input acceleration limit and the determined acceleration and speed profiles are desired main planetary carrier acceleration and speed profiles and desired input acceleration and speed profiles.

4. The method of claim 1, further comprising determining an optimum input torque, wherein determining the first electric motor torque and the second electric motor torque is also based on the determined optimum torque.

5. The method of claim 1, wherein the determined acceleration limit is a main planetary carrier acceleration limit and the determined acceleration and speed profiles are desired main planetary carrier acceleration and speed profiles.

6. The method of claim 1, further comprising:
setting a torque of the first clutch to zero; and
setting a torque of the second clutch to zero.

7. The method of claim 6, wherein the determined acceleration limit is a main planetary carrier acceleration limit and the determined acceleration and speed profiles are desired main planetary carrier acceleration and speed profiles.

8. A controller for controlling first and second electric motors of a vehicle having an electrically variable transmission during a transmission shift operation, said controller comprising:
a processor programmed to:
determine whether a type of shift being performed is (1) a clutch-to-clutch shift with input torque control, (2) a clutch-to-clutch shift with first and second motor torque and battery power control or (3) a synchronous shift with first and second motor torque and battery power control;
determine if a first clutch is being applied or released during the transmission shift operation;
determine if a second clutch is being applied or released during the transmission shift operation;
determine an acceleration limit based on the type of shift being performed and which of the first and the second clutch is being applied and/or released;
determine acceleration and speed profiles based on the type of shift being performed, which of the first and the second clutch is being applied and/or released and the acceleration limit;
determine a first electric motor torque and a second electric motor torque based on the acceleration and speed profiles;
set a torque of the first electric motor to the determined first electric motor torque;
set a torque of the second electric motor to the determined second electric motor torque;
determine a first clutch torque and a second clutch torque based on the acceleration and speed profiles;
set a torque of the first clutch to the determined first clutch torque; and
set a torque of the second clutch to the determined second clutch torque.

9. The controller of claim 8, wherein the processor is further programmed to:
determine an engine torque based on the acceleration and speed profiles; and
set a torque of the engine to the determined engine torque.

10. The controller of claim 8, wherein the determined acceleration limit is an input acceleration limit and the determined acceleration and speed profiles are desired main planetary carrier acceleration and speed profiles and desired input acceleration and speed profiles.

11. The controller of claim 8, wherein the processor is further programmed to determine an optimum input torque, wherein the processor determines the first electric motor torque and the second electric motor torque also based on the determined optimum torque.

12. The controller of claim 8, wherein the determined acceleration limit is a main planetary carrier acceleration limit and the determined acceleration and speed profiles are desired main planetary carrier acceleration and speed profiles.

13. The controller of claim 8, wherein if the type of shift being performed is the synchronous shift with first and second motor torque and battery power control, the processor is further programmed to:
set a torque of the first clutch to zero; and
set a torque of the second clutch to zero.

14. The controller of claim 13, wherein the determined acceleration limit is a main planetary carrier acceleration limit and the determined acceleration and speed profiles are desired main planetary carrier acceleration and speed profiles.

* * * * *